United States Patent Office 3,128,272
Patented Apr. 7, 1964

3,128,272
PERFLUOROALKYL-SUBSTITUTED TRIAZINES
Robert L. Wear, West St. Paul, and Arthur H. Ahlbrecht, White Bear Lake, Minn., assignors to Minnesota Mining and Manufacturing Company, St. Paul, Minn., a corporation of Delaware
No Drawing. Filed June 11, 1957, Ser. No. 664,911
9 Claims. (Cl. 260—249.6)

This invention relates to fluorocarbon compounds and more particularly to fluorocarbon-substituted triazines and formaldehyde condensates thereof.

Amino-triazines having hydrocarbon substituents are known and compounds of the general formula

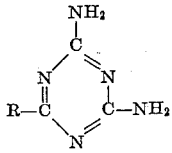

in which R is alkylamino, arylamino, alkoxy, and aryloxy may be reacted with formaldehyde to yield polymethylol derivatives, which in turn may be condensed to thermosetting crosslinked polymeric products. Such compounds and polymers are disclosed in U.S. Patents Numbers 2,197,357, 2,392,607, 2,392,608, 2,392,649, 2,393,754, 2,418,336, and 2,731,438. The polymeric products described therein have been of special interest because of the relative ease with which a wide variety of properties may be attained through suitable selection of the substituent R. Thus with R representing a long chain alkylamino or alkoxy group, the near-maximum deviation from the harder, more brittle characteristics of the unmodified triamino triazineformaldehyde condensate polymer is attained, thus producing flexible resins. By suitable modification of the N-alkyl substituent of the triamino triazine it has also heretofore been possible to obtain an enhanced degree of water repellency as compared with the formaldehyde condensate of the corresponding unsubstituted compound. However, the advantages attained in the direction of water repellency of these triazineformaldehyde condensates were brought about heretofore only with concomitantly increased oil sensitivity or wettability, and no adequate solution to this problem has heretofore been available.

Additionally, it has heretofore been possible to prepare certain tri(polyfluoroalkyl)cyanurates, as disclosed in U.S. Patent 2,741,606. These compounds are, however, incapable of condensing with aldehydes to form polymeric substances.

This invention has as one object the provision of new and novel fluorocarbon-substituted amino-triazines which can be condensed with formaldehyde to yield polymeric products of marked oil repellency. An additional object of the invention is to provide thermosetting polymers possessing both oil and water repellent characteristics. A further object of the invention is to provide surface coating compositions of enhanced oil and water repellent characteristics. A still further object of the invention is to provide curing agents for oxirane type resins which will enhance the oil and water repellency of such resins.

In accordance with the above objects, and other objects of the invention which will become evident hereinafter, it has been found that certain substituted symmetrical triazines which can be represented by the formula

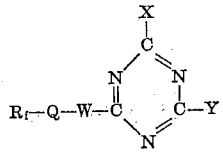

wherein X and Y are chosen from the group consisting of amino and hydrazino radicals, $R_f$ is a perfluoroinated alkyl radical having 4 to 12 carbon atoms, and QW is a linking group, in which Q is a member of the group consisting of divalent sulfonyl, carbonyl and methylene radicals, and when Q is sulfonyl, W is a divalent radical of the group consisting of —NH(CH$_2$)$_n$NH— and —NR—, wherein $n$ is an integer from 1 to 12 and R is hydrogen or a lower alkyl radical; when Q is carbonyl, W is a divalent radical of the group consisting of —NH(CH$_2$)$_m$NH— and —NH—, wherein $m$ is a number from 0 to 12; and when Q is a methylene radical, W is a divalent radical of the group consisting of —(CH$_2$)$_m$O— and —(CH$_2$)$_m$—NH— wherein $m$ is a number from 0 to 12, and the condensation products thereof with formaldehyde, possess particular utility with regard to oil and water repellency.

The compounds of the invention are further illustrated by compounds of the above general formula, in which the components Q and W of the linking group taken together are designated as Z, and Z is one of the divalent radicals

R
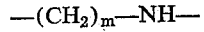
—CO—NH(CH$_2$)$_m$NH—
—CONH—
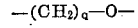
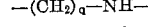

wherein $n$ is an integer from 1 to 12, $m$ is a number from 0 to 12, $q$ is an integer from 1 to 13, and R is a member of the group consisting of hydrogen and lower alkyl radicals.

The following compounds having the above-mentioned linking groups further illustrate the scope of the above general formula:

2,4-diamono-6-(perfluorododecanoyl hydrazido)-s-triazine,
2,4-diamino-6-(1,1-dihydroperfluorododecyloxy)-s-triazine
2,4-diamino-6-(N-methyl-perfluorododecanesulfonamido)-s-triazine,
2,4-diamino-6-(1,1-dihydroperfluorododecyl amino)-s-triazine,
2,4-diamino-6-(3-oxa-1,1-dihydroperfluorohexyloxy)-s-triazine,
2,4-diamino-6-(3-oxa-1,1,2,2-tetrahydroperfluorohexyloxy)-s-triazine
2,4-diamino-6-(1,1-dihydroperfluoroethoxy)-s-triazine,
2,4-diamino-6-(ω-perfluorooctylundecyloxy)-s-triazine,
2,4-dihydrazino-6-(1,1-dihydroperfluoropropoxy)-s-triazine,
2-amino-4-hydrazino-6-(N-propyl-perfluorohexanesulfonamido)-s-triazine,
2,4-dihydrazino-6-(N-ethyl-perfluorododecanesulfonamido)-s-triazine,
2,4-dihydrazino-6-(perfluorobutanoylhydrazido)-s-triazine.

Broadly speaking, the linking groups employed in the present invention are introduced by several methods each of which is adapted to the particular type of compound, as will be apparent hereinafter. Thus, suitable fluorinated compounds can be condensed with a mono-halogenated triazine derivative or a halogen derivative of the fluorinated compound can be condensed with a suitable derivative of the selected triazine. For example, those compounds which contain carboxylic hydrazide groups in the linking group can be made by condensing a perfluorinated acid halide or ester with hydrazine or substituted hydrazine and then further condensing the resultant hydrazide, for example with 6-chloro-2,4-diamino-s-triazine (formed by partial reaction of commercially available cyanuric chloride with ammonia, as described in the Journal of the American Chemical Society, volume 73, pages 2981-2983). In this case the acid halide may be a chloride or fluoride of a carboxylic acid containing the selected perfluorinated group. The formation of amides of fluorinated carboxylic acids by this method has been disclosed by Diesslin and Kauck in U.S. Patent 2,567,011 and of fluorinated sulfonic acids by Brice and Trott in U.S. Patent 2,732,398. The reactions are illustrated by the following equations wherein $R_f$ has the same significance as hereinabove:

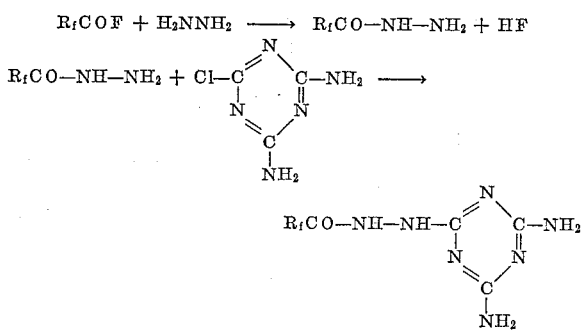

The 1,1-dihydroperfluoroalkyl amines and alcohols described by Husted and Ahlbrecht in U.S. patents numbered 2,691,043 and 2,606,797, respectively, and distally perfluorinated alkanols and alkyl amines hereinafter described condense with 6 - chloro - 2,4-diamino-s-triazine analogously.

Alkyene diamines are incorporated in the linking group

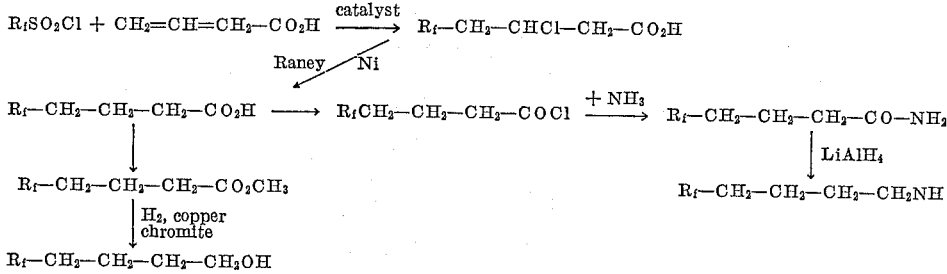

as shown in the following equation in which $R_f$ and $n$ have the same significance as set forth herein:

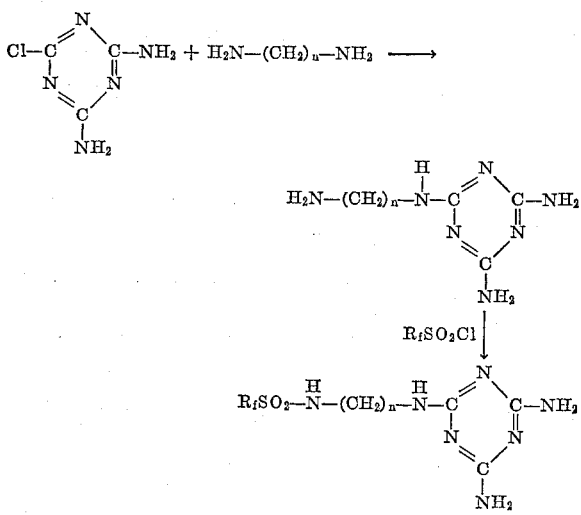

Perfluorinated carboxylic acid esters and halides can be employed instead of the sulfonyl halide in these reactions.

Perfluoroalkanesulfonamides are condensed with cyanuric chloride by the reactions illustrated by the following equations, wherein $R_f$ and R again have the significance described hereinabove:

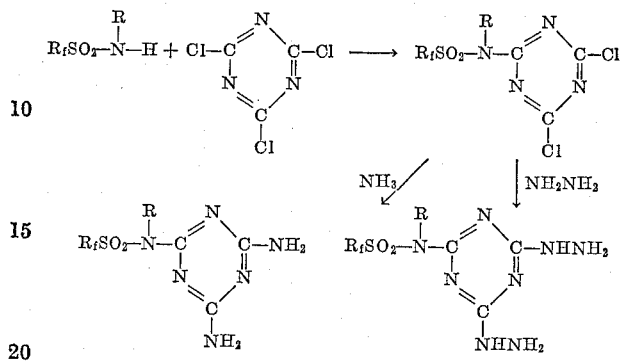

Those compounds in which a plurality of methylene groups are interposed between the perfluoroalkyl group and an hydroxyl or carboxylic acid group are available by first desulfonylatively reacting a perfluoroalkanesulfonyl chloride or perfluoroalkyl iodide with a distally unsaturated alkenol, alkenoic acid or esters thereof followed by reductive dehydrohalogenation and, if needed, saponification to furnish the desired materials. The distally perfluoroalkylated alkanols and also the corresponding perfluoroalkyl amines are available by reduction respectively of the corresponding acids perpared as above or of the amides thereof, these latter reactions being analogous to those more fully described in U.S. patents numbered 2,666,797 and 2,691,043. Schematically, the reactions leading to these intermediates can be illustrated by the following equations, wherein $R_f$ has its usual significance as herein employed:

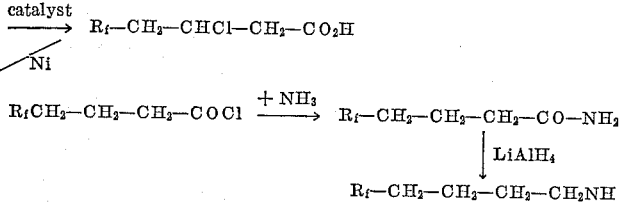

Suitable catalysts for effecting the condensation of the perfluoroalkanesulfonyl halide and the unsaturated acid are, for example, organic and inorganic peroxides, azo compounds, actinic light and the like, although heating the reactants alone, over a relatively longer period of time, will accomplish the desired result.

The perfluoroalkyl group-containing triazines of the invention are useful intermediates for the preparation of polymeric substances by condensation with formaldehyde. The polymeric materials thus produced are thermosetting resins which exhibit oil and water repellent characteristics. Thus, they can be cast in the form of thin sheets or films which have these properties, or they can be employed as coatings; for example on fibrous substrates such as paper and the like, to impart oil and water repellency thereto.

Additionally, the substituted triazines of the invention can be used as curing agents for epoxy resins, whereby the cured resins have increased oil and water repellency.

The following examples will more specifically illustrate the preparation and properties of the compounds of the invention. As examples, they are to be considered as non-limiting in their descriptive aspects.

EXAMPLE I

A mixture of about 27 g. (0.18 mole) 2,4-diamino-6-chloro-s-triazine and 150 g. (0.375 mole) of 1,1-dihydroperfluorooctyl alcohol is refluxed with 7 g. (0.18 mole) of sodium hydroxide for 2 hours. The reaction mixture is then cooled and is poured into about one liter of diethyl ether. The desired 2,4-diamino-6-(1,1-dihydroperfluorooctoxy-s-triazine formed in the reaction precipitates and is isolated by filtration. After recrystallization from ethanol, the 2,4-diamino-6-(1,1-dihydroperfluorooctoxy)-s-triazine thus prepared melts at about 174–5° C.

*Analysis.*—Found: 26.0% C, 55.4% F. Calculated: 26.0% C, 56.0% F.

When the procedure of this example is repeated, using corresponding amounts of 1,1-dihydroperfluoropentanol, 1,1-dihydroperfluorononanol or 1,1-dihydroperfluorododecanol (all of which are prepared as described in U.S. Patent 2,666,797), there are obtained, respectively, 2,4-diamino-6-(1,1-dihydroperfluoropentoxy)-s-triazine, 2,4-diamino-6-(1,1-dihydroperfluorononoxy)-s-triazine and 2-4-diamino-6-(1,1-dihydroperfluorododecoxy)-s-triazine.

Fluorinated alcohols containing perfluorinated "tails" attached to the omega carbon atom of an alkanol can be prepared by known methods; for example, by reduction of the corresponding fluorocarbon monocarboxylic acids with lithium aluminum hydride in ether solution. This and other methods for accomplishing the reduction are described in U.S. Patent 2,732,370. The distally perfluoroalkylated aliphatic acids employed as starting materials can be prepared by condensation of a perfluoroalkanesulfonyl halide with a terminally unsaturated aliphatic acid, followed by reductive dehydrohalogenation in the presence of Raney nickel catalyst. The reaction is exemplified by the preparation of 5-perfluorooctylpentanoic acid, as follows:

A mixture of 26.8 g. (0.052 mole) of perfluorooctanesulfonyl chloride and 5.0 g. (0.050 mole) of 4-pentenoic acid (allyl-acetic acid) is refluxed for about four hours at about 120–145° in the presence of a catalytic amount (1.0 g.) of di-tertiary butyl peroxide. The reaction mixture is fractionally distilled under reduced pressure and the fraction boiling at about 100° C. at 0.010 mm. is collected. After recrystallization from a mixture of chloroform and carbon bisulfide, the 4-chloro-5-(perfluorooctyl) pentanoic acid thus prepared melts at about 89–90° C. The 4-chloro-5-(perfluorooctyl)-pentanoic acid thus prepared is hydrogenated by shaking a solution of 8.00 g. (0.0145 mole) of the acid and 2.5 g. (0.062 mole) of sodium hydroxide in a mixture of 30 ml. of water and 30 ml. ethanol for 3 hours at 140° C. in a rocking high-pressure hydrogenation apparatus in the presence of 4 g. Raney nickel catalyst and with hydrogen supplied at 2500 p.s.i. pressure. After removal of the catalyst, evaporation to dryness, solution of the residue comprising sodium perfluorooctyl pentanoate in water and acidification of the resulting solution, the saturated perfluoroalkyl aliphatic acid formed by hydrogenation is isolated as a waxy white precipitate, which can be distilled at 100° C. at 0.02 mm. pressure. After recrystallization from carbon bisulfide, the 5-(perfluorooctyl)-pentanoic acid thus prepared melts at about 86.5–87.3° C.

The 5-(perfluorooctyl)-pentanoic acid thus prepared is converted to 5-(perfluorooctyl)-pentanol by lithium aluminum hydride reduction, as set forth above.

When 5-(perfluorooctyl)-pentanol is employed in the procedure used hereinabove, in place of 1,1-dihydroperfluorooctanol, there is obtained 2,4-diamino-6-(5-perfluorooctyl-pentanoxy)-s-triazine.

EXAMPLE II 106 g. (0.2 mole) of the sodium salt of N-methyl-perfluorooctane sulfonamide are reacted with a solution of 37 g. (0.2 mole) of cyanuric chloride in 400 ml. of acetone at 5° C. for about 90 minutes and then stirred at room temperature for about 3 hrs. The reaction mixture is filtered and the 2(N-methyl-perfluorooctane sulfonamido)-4,6-dichloro-s-triazine formed in the reaction is isolated from the filtrate by evaporation of the acetone. After recrystallization from carbon tetrachloride the product melts at about 102–104° C. Sixty g. of 30% aqueous ammonia and 20.5 g. (0.03 mole) of the substituted triazine thus prepared are then inter-reacted in a stainless steel autoclave under autogenous pressure at 125° C. The chlorine atoms are thus replaced by two amino groups to furnish 2,4-diamino-6-(N-methyl-perfluorooctanesulfonamido)-s-triazine, which is isolated by evaporation of the aqueous solution to dryness and recrystallization of the residue from methanol. The product melts at about 182–184° C. Calculated for $C_{12}H_7F_{17}SO_2N_6$: C, 23.2%, F, 51.9%. Found: C, 23.2%; F, 52.1%.

The sulfonamide from which the sodio derivative employed as a starting material in this example is formed can be obtained by the process of U.S. Patent No. 2,732,-398 which patent also discloses other suitable fluorinated compounds useful as starting materials for the compounds of the present invention.

N-alkyl-perfluoroalkyl sulfonamides can also be obtained by the method described in the application of Ahlbrecht et al., Serial No. 560,900, now U.S. Patent 2,803,-615. The preparation of N-n-propyl-perfluorooctanesulfonamide illustrates this method, as follows:

A flask equipped with a thermometer, stirrer and distilling head is successively charged with about 10 liters of isopropyl ether, 1.6 kg. of n-propylamine, and then with 4,544 grams of perfluorooctane sulfonyl fluoride previously purified by washing twice with pyridine, followed by a dilute hydrochloric acid wash and a water wash, drying over magnesium sulfate, treating with decolorizing activated carbon, and filtering. The latter material is added over a period of 1½ hours with constant stirring to maintain the temperature at about 25–30° C. and for 2 hours at 40° C. After cooling to room temperature, the mixture is washed with about 4.5 liters of 9% aqueous hydrochloric acid solution. The acid washings are separated and the product is rewashed with about 4.5 liters of an aqueous solution containing 4.5% hydrochloric acid and 4% ferrous sulfate, and the aqueous phase is again removed. The reaction flask is fitted with a distilling head, and the ether is removed by distillation under reduced pressure at a water bath temperature of 70–80° C., yielding N-propyl-perfluorooctane sulfonamide represented by the formula:

$$C_8F_{17}SO_2N(C_3H_7)H$$

The sodium salt is prepared by dissolving 4.6 kg. of this amide product in about 5 liters of absolute methanol, adding 474 grams of sodium methoxide ($CH_3ONa$) in 2,300 ml. of absolute methanol, and removing the alcohol by distillation of the reaction mixture under reduced pressure at a bath temperature of 70–80° C.

When the sodium salt of N-n-propyl-perfluorooctanesulfonamide is employed in the procedure of this example, in place of the sodio-derivative of N-methyl-perfluoro-octane-sulfonamide, there is produced the corresponding 2,4-diamino - 6 - (N - n - propyl - perfluorooctanesulfonamido)-s-triazine.

EXAMPLE III

Following the procedure of Example II, a solution of 15 g. (0.041 mole) of the sodium salt of N-methyl-perfluorobutanesulfonamide in 30 ml. of acetone is added slowly and with stirring to a solution of 7.6 g. (0.041 mole) of cyanuric chloride in 40 ml. of acetone at about 20° C. There is a slight evolution of heat and the mixture is allowed to stand at ambient temperature for about 1 hour. The precipitate of sodium chloride which forms is removed by filtration and washed with a small amount of acetone. The combined filtrate and washings are evaporated on the steam bath, yielding as a residue a waxy solid to which is added 60 ml. of 28% aqueous ammonia. After the somewhat exothermic initial reaction, this mixture is heated in a stainless steel autoclave at 100–110° C. for three hours. The product, 2,4-diamino - 6 - (N-methyl-perfluorobutanesulfonamido)-s- triazine, precipitates and is collected by filtration, washed with water and recrystallized from methanol. The 2,4-diamino - 6 - (N-methyl-perfluoro-butanesulfonamido)-s-triazine thus prepared melts at about 150° C. and contains no detectible chlorine. Analysis: calculated 37.7% F; found, 38.7% F. The compound is useful as a curing agent for epoxy-type resins.

EXAMPLE IV 2,4 - dihydrazino-6-(1,1-dihydroperfluorohexylamino)-s-triazine is prepared by reacting 9.5 g. (0.05 mole) of cyanuric chloride, 15 g. (0.05 mole) of 1,1-dihydroperfluorohexylamine and 2.7 g. (0.025 mole) of anhydrous sodium carbonate in a mixture of 20 g. of dioxane and 30 g. of water at 5° C. for about 1 hour. To the reaction mixture are then added 23 g. (0.4 mole) of 85% hydrazine hydrate and the mixture is refluxed for about 2 hours. On cooling, the 2,4-dihydrazino-6-(1,1-dihydroperfluorohexylamino)-s-triazine precipitates, and is collected by filtration. Without further purification the product melts at 193–208° C. Analysis of the material thus prepared showed 22.4% N, 50.0% F, 25.1% C; calculated for $C_9H_7F_{11}N_8$ 25.6% N, 47.7% F, 24.7% C. This product readily reacted with the bisphenol A-epichlorohydrin epoxy-resin (available commercially under the trade mark Epon 828), when mixed therewith and heated, to give a firmly cured product. This utility as a curing agent for epoxy-type resins is characteristic of the several compounds of this invention.

EXAMPLE V 2,4 - diamino-6-(perfluorooctanoylhydrazido)-s-triazine is prepared by the reaction of 8.6 g. (0.02 mole) of perfluorooctanoic acid hydrazide with 3.0 g. (0.021 mole) of 2,4-diamino-6-chloro-s-triazine in 150 ml. water by slow addition thereto of 0.8 g. (0.02 mole) of sodium hydroxide (dissolved in 10 ml. of water) during a reflux period of about 2 hours followed by cooling. The product is obtained as a precipitate of crude material which is recrystallized from 80% aqueous ethanol. The 2,4-diamino - 6-(perfluorooctanoylhydrazido)-s-triazine thus prepared melts at about 259–260° C. The use of this substance to produce a formaldehyde condensate resin is carried out in a manner analogous to that disclosed in the following example, and there is produced a hard, insoluble and oleophobic resin.

EXAMPLE VI

Two grams of 2,4-diamino-6-(N-methyl-perfluorooctanesulfonamido)-s-triazine prepared by the procedure of Example III are refluxed for about 1.5 hours with 10 g. of 37% aqueous formaldehyde. The reaction mixture is evaporated to dryness and the residual resin is dissolved in about 50 ml. of dioxane. Films cast from this solution can be cured at 165° C. for about 30 minutes to give a hard, insoluble, oleophobic, heat resistant polymer. The curing time can be shortened by adding a catalyst, for example, maleic anhydride or oxalic acid.

EXAMPLE VII

A mixture of 6.2 g. of 2,4-diamino-6-(N-methylperfluorooctanesulfonamido)-s-triazine, 3.2 g. of 37% aqeuous formaldehyde and 12 g. of butanol-1 is refluxed for 4 hours under a Barret trap which serves to remove the water initially present and formed in the reaction. The solution of resin thus formed is diluted with about 90 ml. of dioxane and about 0.05 g. of maleic anhydride is added thereto as a catalyst. Polymer films cast from this solution and thoroughly cured at 165° C. are hard and brittle and show average advancing contact angles of 109° and 54° to water and hexadecane, respectively, and average receding contact angles of 92° and 48° respectively. These results clearly demonstrate the hydrophobic and oleophobic properties of this resin since wetting is indicated by an angle of 0°.

EXAMPLE VIII

In a procedure analogous to that of Example VII, 1.5 g. of 2,4-diamino-6-(1,1-dihydroperfluorooctoxy-s-triazine is condensed with formaldehyde by refluxing for about 2 hours with 20 g. of a 37% aqueous formalin solution, followed by dehydration. A polymer is produced which is soluble in dioxane and is cured by heat either in the presence or absence of maleic anhydride to a hard, brittle insoluble polymer of value as in inert protective coating for metal surfaces. For the purpose of coating metal it is applied as a solution in a suitable solvent, for example, dioxane, and then baked in the usual way.

The 2,4 - dihydrazino - 6-(1,1-dihydroperfluorohexylamino)-s-triazine produced in Example V is condensed with formaldehyde by the procedure of Example VII. A water insoluble, oleophobic resin, curable by heating, is thus produced.

EXAMPLE IX

A mixture of 4.5 g. (0.01 mole) of 2,4-diamino-6-(N-methyl-perfluorobutanesulfonamido)-s-triazine produced by the method of Example IV and 3.3 g. (0.04 mole) of 37% aqueous formaldehyde in 5 ml. of dioxane is refluxed for 2.5 hours. The resulting solution is usable directly for casting films. Such a film, baked for 2 hours at 120° C., is perfectly clear and transparent, glossy, hard and brittle and shows advancing contact angles of from 54° to 96° and 0° to 28° to water and hexadecane, respectively. The receding contact angles measured varied over different parts of the film when in contact with water and were 0° for contact with hexadecane.

The resins of this invention confer valuable hydroprobic and oleophobic properties on fibrous webs, such as textiles. Hydrophobic properties are measured by Standard Spray List Ratings of 0, 50, 70, 80, 90 and 100 determined by Method 22–52 of the American Association of Textile Chemists and Colorists and described, for example, on pages 136 to 138 inclusive of the Technical Manual and Yearbook of that association for the year 1954. It is to be noted that this method provides for no interpolation of results which are reported as one of the above six ratings.

Oleophobic properties are measurable by means of ratings assigned on the basis of resistance for 3 minutes to drops of mixtures varying by 10% increments from pure mineral oil (Nujol, Stanolind, etc.) to pure turpentine applied gently to the surface of the textile maintained level and are indicated by numerals 0 to 10 respectively for the mixture of highest turpentine content which fails to penetrate. Thus the numeral 5 indicates a mixture of 50% of each of the two components. Interpolation is judged visually and indicated where significant by means of plus (+) or minus (−) signs.

EXAMPLE X

Swatches of clean cotton cloth about 6" square are impregnated by padding with solutions of the indicated concentrations of the resin of Example IX. After drying to remove dioxane the samples are cured for the times and at the temperatures indicated and tested and assigned spray ratings and oil resistance ratings. The tests are repeated after a standard laundering cycle of 1 hour in a Launder-ometer at 160° F. The results of the tests are as follows:

*Treated Cotton*

| Concentration of resin in dioxane | Cure | | Spray Rating | | Oil Resistance Rating | |
|---|---|---|---|---|---|---|
| | Time (min.) | Temp., ° C. | Cured | Laundered | Cured | Laundered |
| 1% | 5 | 120 | 50 | 70 | 8+ | 6+ |
| 1% | 30 | 120 | 70 | 70 | 7 | 5+ |
| 1% | 4 | 180 | 80 | 70+ | 5+ | 5 |
| 2% | 5 | 180 | 80+ | 80 | 9− | 6− |

Untreated cotton cloth, used as a control, shows substantially zero rating in both spray and oil resistance tests before and after laundering.

A polyethylene glycol terephthalate fabric treated in a similar manner with a 1.5% solution of the resin of Example VII and cured 10 minutes at 130° C. and tested in the same way rates 80 for spray resistance and 10+ for oil resistance. A cotton fabric treated in this manner rates 90 for spray resistance and 7 for oil resistance.

Similarly, solutions of other resins of this invention, as for example those disclosed in Examples VIII and IX, impart desirable hydrophobic and oleophobic properties to textiles such as cotton, wool, linen, silk and synthetic fibers. Similar treatments are also applicable to such nonwoven mats or webs of fibers as paper and felt.

EXAMPLE XI

The dihydrazino compounds exemplified by the 2,4-dihyrazino-6-(1,1-dihydroperfluorohexyl amino)-s-triazine prepared by the process of Example V effectively cure epoxy (oxirane) resins such as bisphenol A-epicholohydrin resins. The new curing agents of the present invention thus provide a novel method of introducing chemically bound perfluoroalkyl groups into epoxy resins.

For curing a typical epoxy resin, 2,4-dichloro-6-(N-methyl-perfluorooctanesulfonamido)-s-triazine is converted to the corresponding 2,4-dihydrazino compound by heating 20 g. (0.03 mole) of the former with 30 g. (0.5 mole) of 85% hydrazine hydrate in 20 ml. of water at 90° C., while adding a solution of 2.4 g. (0.06 mole) of sodium hydroxide in 15 ml. of water thereto over a period of 2 hours. The product is collected and washed thoroughly with water. After drying, the 2,4-dihydrazino-6-(N-methyl-perfluoroctanesulfonamide)-s-triazine thus prepared melts at about 185° C.

*Analysis.*—Calculated: 49.5% F. Found: 50.4% F.

A mixture of 3.0 g. of the dihydrazino triazine and 4.0 g. of an epoxy resin (available commercially as Bakelite 2774) is placed in an oven at 165° C. After about 1 hour, the mixture has gelled and after 3 hours it has cured to a hard, glossy, oleophobic, transparent resin which shows a Rockwell hardness of about 112.

EXAMPLE XII

In a 500 ml. flask fitted with condenser and dropping funnel are placed 100 ml. of water, 15 g. (0.1 mole) of 2,4-diamino-6-chloro-s-triazine and 45 g. (0.4 mole) of hexamethylene diamine and the mixture is refluxed for 2 hours during which time a solution of 4.0 g. (0.1 mole) of NaOH in 20 ml. of water is added very slowly. At the end of this time the reaction mixture is cooled and the crystalline residue of 2,4-diamino-6-(6-aminohexyl amino)-s-triazine is collected, thoroughly washed by resuspension in water and again collected and air-dried. This material is recrystallized from isopropanol or absolute ethanol and then melts at 175–177° C.

*Analysis.*—Calculated: 48.0% C; 8.5% H; 43.5% N. Found: 47.9% C; 8.4% H; 43.9% N. Other 2,4-diamino-6-(π-aminoalkyl amino)-s-triazines are formed by analogous reactions.

In a 250 ml. flask fitted with reflux condenser are placed about 75 ml. of absolute ethanol, 6.8 g. (0.02 mole) of ethyl perfluorovalerate and 4.5 g. (0.02 mole) of 2,4-diamino-6-(6-amino hexylamino)-s-triazine prepared as set forth above. The mixture is refluxed for 1.5 hours in a steam bath, the hot reaction mixture filtered to remove suspended solids, concentrated and cooled. The crystalline material which precipitates on cooling is recovered by filtration and washed with ether. A further amount is obtained by evaporation and cooling of the mother liquors. The crystalline 2,4 - diamino-6-(6-perfluorovaleramido hexylamino)-s-triazine thus prepared is recrystallized first from ethanol and then from aqueous methanol, and thereafter melts at about 118° C. Analysis: calculated 18.8% N; 40.1% F; found, 18.9% N; 39.2% F.

EXAMPLE XIII

In a 250 ml. flask fitted with a reflux condenser and dropping funnel are placed 100 ml. of purified dry dioxane and 18 g. (0.08 mole) of 2,4-diamino-6-(6-amino hexyl amino)-s-triazine prepared as described in Example XII. In the dropping funnel is placed 20.0 g. (0.04 mole) of perfluorooctanesulfonyl fluoride which, after the dioxane solution in the flask has been heated to gentle boiling, is added very slowly at such a rate that gentle refluxing is maintained by application of external heat and the somewhat exothermic reaction. This requires about 40 minutes after which refluxing is maintained for about 30 minutes. After cooling the crystalline residue is collected and dried. Washing the precipitate with water removes the 2,4-diamino - 6 - (6-amino hexyl amino)-s-triazine, which can be recovered from the aqueous washings. The residue not soluble in water is crude 2,4-diamino-6-(6-perfluorooctanosulfonamidohexylamino) - s - triazine. After recrystallization from ethanol, the latter melts sharply at about 175° C.

*Analysis.*—Caluculated: 28.8% C; 45.6% F. Found: 29.4% C; 44.9% F.

A mixture of 7 g. of the crude 2,4-diamino-6-(6-perfluorooctanesulfonamidohexylamino) - s - triazine with about 5 ml. of 37% aqueous formaldehyde and a few drops of 10% sodium hydroxide in 15 ml. of dioxane is refluxed for 1 hour. As a result there is obtained a solution of the corresponding condensation polymer, which is diluted with acetone and butanol and is then applied to the surface of a polyethylene terephthalate film and dried. The surface is thus coated by polymer molecules with exposed fluorocarbon "tails" and is not wetted by toluene.

EXAMPLE XIV

The 5-(perfluorooctyl)-pentanoic acid prepared as described in Example I is first converted to the acid chloride by treating with phosphorus pentachloride in slight excess and then to the amide by treatment with an excess of ammonia. The white crystalline amide is dried and reduced to the amine with lithium aluminum hydride by the procedure described in U.S. Patent 2,691,043 for perfluorinated acid amides. When the resultant 5-(perfluorooctyl)-amyl amine is then used in place of the 1,1-dihydroperfluorooctanol for reaction with 6-chloro-2,4-diamino-s-triazine in the procedure of Example I, there is obtained 2,4-diamino-6-(5-perfluorooctyl-amyl-amino)-s-triazine.

Another use for the compounds of this invention and more particularly their formaldehyde condensates is as hardening agents for alkyl-urea-formaldehyde, and melamine-formaldehyde resins. A simultaneous increase in the oil- and water-repellency of the surfaces of the resins so hardened is produced because of the fluorocarbon chains introduced and chemically bound therein.

While the condensation of the monomers of the invention to form resinous products has been illustrated herein by the use of formaldehyde, it will be apparent therefrom to those skilled in the art that other substances can equally well be employed as aldehydic reactants for the purpose. Thus compounds capable of engendering formaldehyde can be used, e.g. paraformaldehyde and hexamethylene tetramine. Other aldehydes can be employed, such as acetaldehyde, furfural and the like. The disclosure of D'Alelio et al. in U.S. Patent Number 2,393,754 is illustrative of the aldehydes and derivatives thereof suitable for condensation with the substituted triazines of the invention.

What is claimed is:
1. Perfluoroalkyl-substituted triazines of the formula:

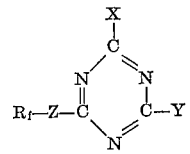

wherein X and Y are selected from the group consisting of amino and hydrazino radicals and $R_f$—Z— is selected from the group consisting of $$R_f-SO_2NH(CH_2)_nNH-$$
$$R_f-SO_2N(R)-$$

and $$R_f-(CH_2)_q-O-$$

wherein $R_f$ is a perfluorinated alkyl radical of 4–12 carbon atoms, $n$ is 1–12, R is selected from the group consisting of hydrogen and lower alkyl and $q$ is 1–13.

2. The compounds according to claim 1 wherein $R_f$—Z— is $$R_f-SO_2NH(CH_2)_nNH-$$

and X and Y are $NH_2$.

3. The compounds according to claim 1 wherein $R_f$—Z— is $$R_fSO_2N(R)-$$

and X and Y are $NH_2$.

4. The compounds according to claim 1 wherein $R_f$—Z— is $$R_f-(CH_2)_q-O-$$

and X and Y are $NH_2$.

5. 2,4-diamino-6-(6-perfluorooctanesulfonamidohexylamino)-s-triazine.

6. 2,4-diamino-6-(N-methyl-perfluorooctanesulfonamido)-s-triazine.

7. 2,4-diamino-6-(N-methyl-perfluorobutanesulfonamido)-s-triazine.

8. 2,4-diamino-6-(1,1-dihydroperfluorooctoxy)-s-triazine.

9. The product produced by refluxing together for from 1 to 4 hours concentrated aqueous formaldehyde and a triazine according to claim 1.

References Cited in the file of this patent

UNITED STATES PATENTS

| | | |
|---|---|---|
| 2,165,265 | Hubert et al. | July 11, 1939 |
| 2,328,958 | D'Alelio et al. | Sept. 7, 1943 |
| 2,338,493 | D'Alelio et al. | Jan. 4, 1944 |
| 2,392,649 | D'Alelio et al. | Jan. 8, 1946 |
| 2,418,336 | D'Alelio et al. | Apr. 1, 1947 |
| 2,508,323 | Adams | May 16, 1950 |
| 2,510,503 | Kropa | June 6, 1950 |
| 2,513,264 | Holm-Hansen | June 27, 1950 |
| 2,523,470 | Kropa et al. | Sept. 26, 1950 |
| 2,566,226 | Mackay et al. | Aug. 28, 1951 |
| 2,741,606 | Holt et al. | Apr. 10, 1956 |
| 2,759,019 | Brown et al. | Aug. 14, 1956 |
| 2,764,574 | Widmer et al. | Sept. 25, 1956 |
| 2,767,180 | Winthrop et al. | Oct. 16, 1956 |
| 2,803,615 | Ahlbrecht et al. | Aug. 20, 1957 |
| 2,809,990 | Brown et al. | Oct. 15, 1957 |
| 2,822,347 | Wohnsiedler | Feb. 4, 1958 |

OTHER REFERENCES

Hodgins et al.: Industrial and Engineering Chemistry, volume 33, pages 769–771 (1941).

Gams et al.: British Plastics, pages 508–514 (February 1943).

UNITED STATES PATENT OFFICE

CERTIFICATE OF CORRECTION

Patent No. 3,128,272                                April 7, 1964

Robert L. Wear et al.

It is hereby certified that error appears in the above numbered patent requiring correction and that the said Letters Patent should read as corrected below.

Column 3, line 33, for "2,606,797" read -- 2,666,797 --; columns 3 and 4, lines 38 to 49, for that portion of the equation reading "$R_f SO_2Cl+CH_2=CH=CH_2-CO_2H$" read -- $R_f SO_2Cl+CH_2=CH-CH_2-CO_2H$ --; same lines 38 to 49, for that portion of the equation reading "$R_f-CH_2-CH_2-CH_2-CH_2NH$" read -- $R_f-CH_2-CH_2-CH_2-CH_2NH_2$ --; column 8, line 3, after "-dihydroperfluorooctoxy" insert a closing parenthesis; line 14, for "V" read -- IV --; line 22, for "IV" read -- III --; column 9, line 20, for "V" read -- IV --; line 34, for "-perfluoroctanesulfonamide)-" read -- -perfluorooctanesulfonamido)- --.

Signed and sealed this 15th day of December 1964.

(SEAL)
Attest:

ERNEST W. SWIDER                                            EDWARD J. BRENNER
Attesting Officer                                                Commissioner of Patents